US012651261B2

(12) United States Patent
Moore et al.

(10) Patent No.: US 12,651,261 B2
(45) Date of Patent: Jun. 9, 2026

(54) INTEGRATION PLATFORM USING HUB COMPUTER

(71) Applicant: Visa International Service Association, San Francisco, CA (US)

(72) Inventors: Richard Stewart Alan Moore, Glasgow (GB); Stuart Williamson, Glasgow (GB)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/841,081

(22) PCT Filed: May 25, 2023

(86) PCT No.: PCT/EP2023/064131
§ 371 (c)(1),
(2) Date: Aug. 23, 2024

(87) PCT Pub. No.: WO2023/227750
PCT Pub. Date: Nov. 30, 2023

(65) Prior Publication Data
US 2025/0182108 A1    Jun. 5, 2025

Related U.S. Application Data

(60) Provisional application No. 63/346,051, filed on May 26, 2022.

(51) Int. Cl.
G06Q 20/40 (2012.01)
G06Q 20/02 (2012.01)
(Continued)

(52) U.S. Cl.
CPC ......... G06Q 20/401 (2013.01); G06Q 20/023 (2013.01); G06Q 20/085 (2013.01);
(Continued)

(58) Field of Classification Search
CPC ............. G06Q 20/401; G06Q 20/3278; G06Q 20/3821; G06Q 20/3829; G06Q 20/085;
(Continued)

(56) References Cited

U.S. PATENT DOCUMENTS

| 9,098,843 B2 * | 8/2015 | Fuerstenberg ......... | G06Q 20/14 |
| 11,308,498 B2 * | 4/2022 | Nair ....................... | G06Q 50/40 |

(Continued)

FOREIGN PATENT DOCUMENTS

WO    WO-2021167600 A1 *    8/2021    ......... G06Q 20/3829

OTHER PUBLICATIONS

Payment Card Industry Token Service Providers Additional Security Requirements and Assessment Procedures for Token Service Providers (EMV Payment Tokens), Version 1.0, Dec. 2015, PCI Security Standards Council, 92 pages, hereinafter referred to as TSP (Year: 2015).*

(Continued)

*Primary Examiner* — James D Nigh
(74) *Attorney, Agent, or Firm* — Kilpatrick Townsend & Stockton LLP

(57)    ABSTRACT

A method is disclosed. The method includes receiving, by a hub computer from different validator systems, interaction data for a plurality of interactions conducted by a user on a journey from an initial location to an end location at different validator devices in the different validator systems at different times during the journey. The method includes generating an authorization request message comprising a value associated with the plurality of interactions, and transmitting the authorization request message to an authorizing entity computer. The authorizing entity computer approves or declines the authorization request message, and then gener- (Continued)

ates an authorization response message. The method includes receiving by the hub computer, the authorization response message.

18 Claims, 12 Drawing Sheets

(51) Int. Cl.

| | |
|---|---|
| *G06Q 20/08* | (2012.01) |
| *G06Q 20/18* | (2012.01) |
| *G06Q 20/32* | (2012.01) |
| *G06Q 20/38* | (2012.01) |
| *G07B 15/00* | (2011.01) |
| *G07B 15/04* | (2006.01) |

(52) U.S. Cl.
CPC ......... *G06Q 20/0855* (2013.01); *G06Q 20/18* (2013.01); *G06Q 20/32* (2013.01); *G06Q 20/3224* (2013.01); *G06Q 20/3278* (2013.01); *G06Q 20/3821* (2013.01); *G06Q 20/3829* (2013.01); *G06Q 20/40* (2013.01); *G07B 15/00* (2013.01); *G07B 15/04* (2013.01)

(58) Field of Classification Search
CPC .... G06Q 20/0855; G06Q 20/18; G06Q 20/32; G06Q 20/3224; G06Q 20/40; G06Q 20/023; G07B 15/00; G07B 15/04
USPC .......................................................... 705/64
See application file for complete search history.

(56) References Cited

U.S. PATENT DOCUMENTS

| | | | | |
|---|---|---|---|---|
| 2011/0166995 | A1* | 7/2011 | Fuerstenberg ...... | G07F 17/0014 235/382 |
| 2016/0028550 | A1* | 1/2016 | Gaddam ............. | H04L 63/0823 713/173 |
| 2019/0238519 | A1* | 8/2019 | Bikumala ........... | H04L 63/0823 |
| 2020/0126058 | A1 | 4/2020 | Mars et al. | |

OTHER PUBLICATIONS

Co-Branded Multi-Application Contactless Cards for Transit and Financial Payment, Publication No. TC-08001, Mar. 2008, 40 pages (Year: 2008).*
PCT/EP2023/064131 , "International Search Report and Written Opinion", Aug. 1, 2023, 11 pages.

* cited by examiner

INTEGRATION PLATFORM USING HUB COMPUTER

CROSS-REFERENCES TO RELATED APPLICATIONS

This application is a National Stage of International Application No. PCT/EP2023/064131, filed May 25, 2023, which claims the benefit of and priority to U.S. Provisional Application No. 63/346,051, filed on May 26, 2023, which are herein incorporated by reference in their entirety.

BACKGROUND

Transit operators that provide different transportation services to people often operate independently, with each operator having its own system. For example, a user may need to purchase separate tickets at different locations to use different modes of transportation for a single journey from an initial location to an end location. Each transit operator has its own independent payment system, and would need to process payment for their services independent of other transit operators. Further, the user would be charged multiple times by the different transit operators. This type of processing scheme is duplicative and is inconvenient for the transit system operators and the users of their systems.

Also, some transit operators work with account based ticketing services. In some cases, a credential such as a credit card or debit card number can be used as a way to access a transit station and pay for a ticket on the transit system. While this is convenient, the credential is sensitive information that needs to be protected while being used by transit operators and account based ticketing services. This can be particularly difficult when the transit operators are run by different organizations than the account based ticketing services.

Even if combined systems (e.g., one transit system and one account based ticketing service) can be modified to protect the credentials, it is difficult to provide such protection when adding new transit operators and new account based ticketing services. Each new transit operator and new account based ticketing service would need to specifically be updated with such protection mechanisms. This can be laborious and can prevent scalability.

Embodiments of the disclosure address this problem and other problems individually and collectively.

SUMMARY

One embodiment includes a method comprising: receiving, by a hub computer from different validator systems, interaction data for a plurality of interactions conducted by a user on a journey from an initial location to an end location at different validator devices in the different validator systems at different times during the journey; generating, by the hub computer, an authorization request message comprising a value associated with the interaction data for the plurality of interactions; transmitting, by the hub computer, the authorization request message to an authorizing entity computer, wherein the authorizing entity computer approves or declines the authorization request message, and then generates an authorization response message; and receiving, by the hub computer, the authorization response message.

Another embodiment includes a hub computer comprising: a processor; and a computer readable medium, the computer readable medium comprising code, executable by the processor, for performing operations comprising: receiving, from different validator systems, interaction data for a plurality of interactions conducted by a user on a journey from an initial location to an end location at different validator devices in the different validator systems at different times during the journey; generating an authorization request message comprising a value associated with the interaction data for the plurality of interactions; transmitting the authorization request message to an authorizing entity computer, wherein the authorizing entity computer approves or declines the authorization request message, and then generates an authorization response message; and receiving the authorization response message.

Another embodiment of the invention includes a hub computer comprising: one or more processors; and one or more memory devices, the one or more memory devices comprising a first set of APIs (application programming interfaces) and a second set of APIs, the first set of APIs configured to receive interaction data from validator systems that interact with user devices, the validator systems operated by different validators, and the second set of APIs configured to receive data from different service provider computers managed by the different service providers; a token processing module; and an interaction processing module.

A better understanding of the nature and advantages of embodiments of the invention may be gained with reference to the following detailed description and accompanying drawings.

DETAILED DESCRIPTION

Figure 1:
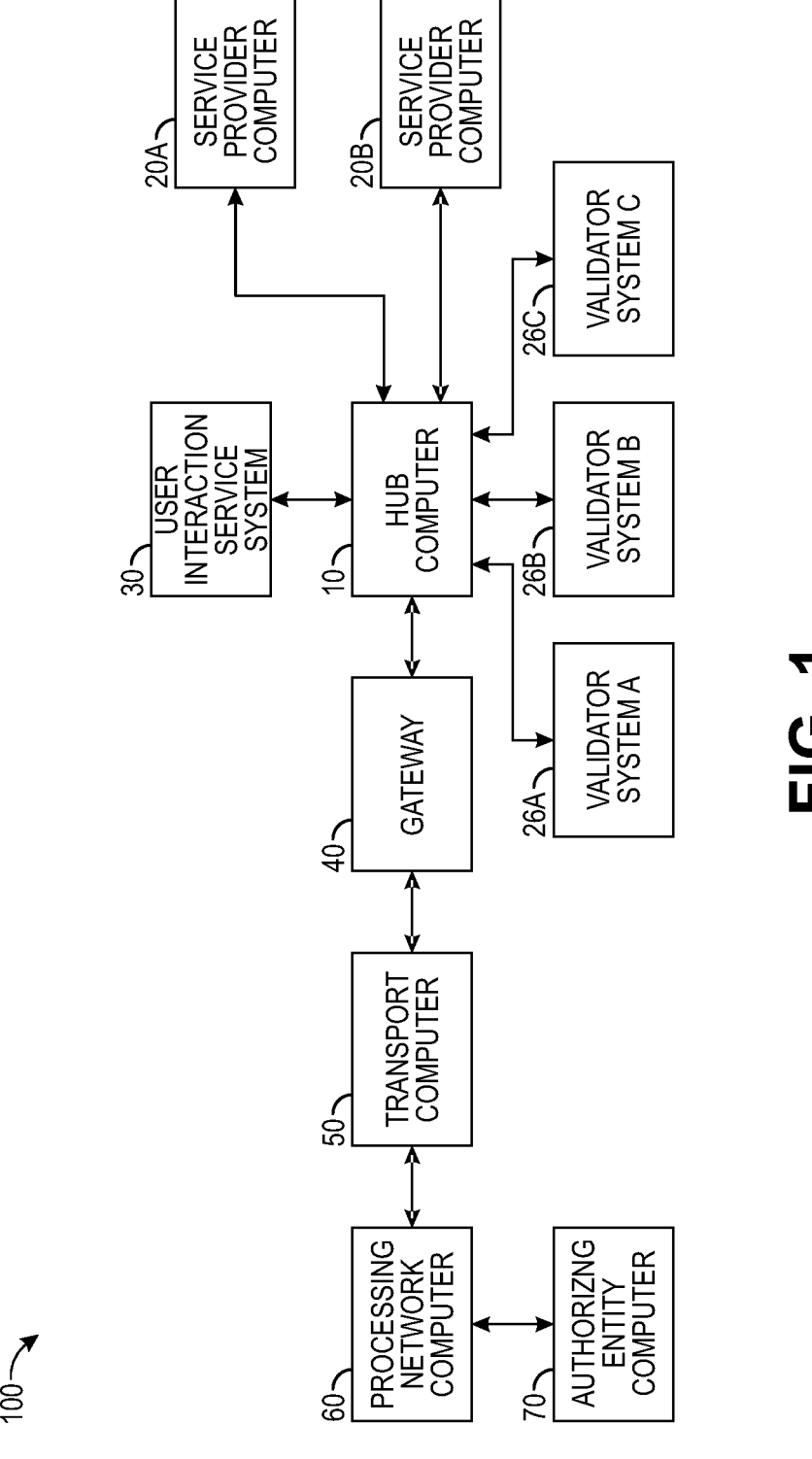
FIG. 1 shows a block diagram of a system according to an embodiment.

Prior to discussing embodiments of the disclosure, some terms can be described in further detail.

A "user" may include an individual. In some embodiments, a user may be associated with one or more personal accounts and/or mobile devices. The user may also be referred to as a cardholder, account holder, or consumer in some embodiments.

A "user device" may be a device that is operated by a user. Examples of user devices may include a mobile phone, a smart phone, a card, a personal digital assistant (PDA), a laptop computer, a desktop computer, a server computer, a thin-client device, a tablet PC, etc. Additionally, user devices may be any type of wearable technology device, such as a watch, earpiece, rings, bracelets, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. A user device may also be a payment device such as a credit, debit, or prepaid card.

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. A payment device may be used to make a payment transaction. Suitable payment devices can be hand-held and compact so that they can fit into a user's wallet and/or pocket (e.g., pocket-sized). Example payment devices may include smart cards, magnetic stripe cards, keychain devices (such as the Speed-pass™ commercially available from Exxon-Mobil Corp.), etc. If a payment device is in the form of a debit, credit, or smartcard, the payment device may also optionally have features such as magnetic stripes. Such devices can operate in either a contact or contactless mode. In some embodiments, a mobile communication device can function as a payment device (e.g., a mobile communication device can store and be able to transmit payment credentials for a transaction).

An "application" may be computer code or other data stored on a computer readable medium (e.g., memory element or secure element) that may be executable by a processor to complete a task.

A "key" may include a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "public key" may include an encryption key that may be shared openly and publicly. The public key may be designed to be shared and may be configured such that any information encrypted with the public key may only be decrypted using a private key associated with the public key (i.e., a public/private key pair).

A "private key" may include any encryption key that may be protected and secure. A private key may be securely stored at an entity and may be used to decrypt any information that has been encrypted with an associated public key of a public/private key pair associated with the private key.

A "public/private key pair" may refer to a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. In some embodiments, the public key may be authorized by a body known as a Certification Authority (CA) which stores the public key in a database and distributes it to any other entity which requests it. The private key can typically be kept in a secure storage medium and will usually only be known to the entity. Public and private keys may be in any suitable format, including those based on Rivest-Shamir-Adleman (RSA) or elliptic curve cryptography (ECC).

A "digital signature" may include an electronic signature for a message. A digital signature may be a numeric data value, an alphanumeric data value, or any other type of data. In some embodiments, a digital signature may be a unique data value generated from a message (or data packet) and a private key using a cryptographic algorithm. In some embodiments, a validation algorithm using a public key may be used to verify the signature. A digital signature may be used to demonstrate the veracity of the sender.

An "interaction" may include a reciprocal action or influence. An interaction can include a communication, contact, or exchange between parties, devices, and/or entities. Example interactions include a transaction between two parties and a data exchange between two devices.

"Credentials" may comprise any evidence of authority, rights, or entitlement to privileges. For example, access credentials may comprise permissions to access certain tangible or intangible assets, such as a building or a file. Examples of credentials may include passwords, passcodes, or secret messages.

"Payment credentials" may include any suitable information associated with an account (e.g., a payment account and/or payment device associated with the account). Such information may be directly related to the account or may be derived from information related to the account. Examples of account information may include a PAN (primary account number or "account number"), username, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided to make a payment from a payment account. Payment credentials can also include a username, an expiration date, a gift card number or code, and any other suitable information.

A "token" may be a substitute value for some other data such as a credential or other interaction data. A token may be a string of numbers, letters, or any other suitable characters. Examples of tokens include access tokens such as payment tokens, data that can be used to access secure systems or locations, etc.

A "payment token" may include an identifier for a payment account that is a substitute for an account identifier, such as a primary account number (PAN) and/or an expiration date. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g., a token) that may be associated with the payment account identifier. Further, tokenization may be applied to any other information that may be replaced with a substitute value (i.e., token). Tokenization enhances transaction efficiency and security.

A "token service computer" can include a system that that services tokens or wallet account identifiers. In some embodiments, a token service computer can facilitate requesting, determining (e.g., generating) and/or issuing tokens, as well as maintaining an established mapping of tokens to primary account numbers (PANs), and both or either of which can be linked to wallet account identifiers, in a repository (e.g., token vault). In some embodiments, the token service computer may establish a token assurance level for a given token to indicate the confidence level of the token or wallet account identifier to PAN binding. The token service computer may include or be in communication with a token vault where the generated tokens or wallet account identifiers are stored. The token service computer may support token processing of payment transactions submitted using tokens or wallet account identifiers by de-tokenizing the token or resolving a wallet account identifier to obtain the actual PAN.

A "token request message" may be an electronic message for requesting a token. A token request message may include information usable for identifying a payment account or digital wallet, and/or information for generating a payment token. For example, a token request message may include payment credentials, mobile communication device identification information (e.g., a phone number or MSISDN), a digital wallet account identifier, information identifying a tokenization service provider, a merchant identifier, a cryptogram, and/or any other suitable information. Information included in a token request message can be encrypted (e.g., with an issuer-specific key). In some embodiments, the token request message may include a flag or other indicator specifying that the message is a token request message.

A "token response message" may be a message that responds to a token request. A token response message may include an indication that a token request was approved or denied. A token response message may also include a payment token, mobile communication device identification information (e.g., a phone number or MSISDN), a digital wallet account identifier, information identifying a tokenization service provider, a merchant identifier, a cryptogram, and/or any other suitable information. Information included in a token response message can be encrypted (e.g., with an issuer-specific key). In some embodiments, the token response message may include a flag or other indicator specifying that the message is a token response message.

An "authorization request message" may be a message that requests permission to conduct an interaction. For example, an authorization request message may include an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include a primary account number that may be associated with a payment device or payment account, or a wallet account identifier associated with a payment account number. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. In some embodiments, it may be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or Xscale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

An "authorizing entity" may be an entity that authorizes a request. Examples of an authorizing entity may be an issuer, a governmental agency, a document repository, an access administrator, etc. An authorizing entity may operate an authorizing entity computer.

An "issuer" may refer to a business entity (e.g., a bank) that issues and optionally maintains an account for a user. An issuer may also issue payment credentials stored on a user device, such as a cellular telephone, smart card, tablet, or laptop to the consumer.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer."

Embodiments of the invention integrate processing functions (e.g., payment processing functions) for different transit systems operated by different transit operators using an integration platform comprising a hub computer (e.g., a ticketing hub). The platform can provide common services such as payment and tokenization services for different transit systems. The integration platform can allow the different transit operators to consolidate EMV (Europay-MasterCard-Visa) and non-EMV transit payment schemes. In some embodiments, a user may use a payment device such as an EMV (Europay, MasterCard, Visa) credit or debit card to pay for tickets for transit services for different transit operators. The credit or debit card can also be used as entry ticket device.

In some embodiments, the platform can include a hub computer (e.g., a ticketing hub) that includes open APIs including a first set of APIs, a second set of APIs, and a third set of APIs. For example, the first set of APIs, the second set of APIs, and the third set of APIs can be a set of user services APIs, a set of ABT (account based ticketing) services APIs, and a set of validator services APIs. By using the sets of APIs, new services can easily integrate to the hub computer.

In some embodiments, the hub computer receives, from different validator systems, interaction data for a plurality of interactions conducted by a user on a journey from an initial location to an end location. The different interactions can involve interactions between a user device of the user, and different validator devices in the different validator systems at different times during the journey. For example, the different validator systems used by a user during a journey can include transit systems such a rail system and a bus system. The user may use a train on the rail system and a bus on the bus system to travel from the initial location to the end location.

The interaction data received by the hub computer may include data including a credential, token, or encrypted versions thereof and validator data. Validator data may be received from a validator system and may include details regarding a particular leg of a journey that the user is taking. For example, the validator data from a train system for a train ride taken by a user on one leg of a journey might include an identifier for the train system, the start and end time of the train ride, the start location and end location of the train ride, etc. Each time the user enters a transit system and each time that the user exits the transit system, the user may be required to interact their user device with a validator device (e.g., an entry gate and an exit gate) to inform the system as to how and when the user used each transit system.

After the hub computer obtains the interaction data from the different validator systems, the hub computer, can generate an authorization request message comprising a value associated with the interaction data for the plurality of interactions. The hub computer can then transmit the authorization request message to an authorizing entity computer. For example, the interaction data from different validator systems may include values associated with the user's use of the different validator systems. For instance, the user may take a train ride on a train system and the train ride may cost twenty dollars. The user may also take a bus ride on a bus system and the bus ride may cost ten dollars. The user may use a credit or debit device to gain access to both the train system and the bus system. For example, the user can tap the credit or debit device at the entry and exit gates in the train system and at the entry and exit points of the bus. Once the user has completed their multi-leg journey, the hub computer can generate an authorization request message comprising a total value of thirty dollars for the cost of the entire journey. In some embodiments, the hub computer can apply a cross-operator cap on the total fare (e.g., twenty-five dollars in the above example). The hub computer can then transmit the authorization request message to an authorizing entity computer that manages an account associated with the credit or debit device.

After the authorizing entity computer receives the authorization request message, it approves or declines the authorization request message, and then generates an authorization response message. The hub computer then receives the authorization response message, and may provide notification of the received authorization response message to the different validator systems.

Later, a clearing and settlement process can take place between the authorizing entity computer, a processing network computer, and the validator systems or the transport computers (e.g., acquirer computers) associated with the validator systems. During this process, actual funds associated with the different amounts owed to the different validators operating the different validator systems can be transferred from the authorizing entity computer to the different validator systems (or payment service providers or acquirers operating on behalf of the validators operating the validator systems).

FIG. 1 is a high level system diagram showing a system according to embodiments. FIG. 1 shows a hub computer 10, which may be a ticketing hub computer. The hub computer 10 can be a server computer and can comprise one or more computational apparatus that work together to perform the functions described herein. In some cases, the hub computer 10 can be a communication hub between multiple validator systems 26A, 26B, 26C, multiple service providers computers 20A, 20B, and one or more user interaction service systems 30.

The hub computer 10 can also be in communication with an authorizing entity computer 70 via a gateway 40, a transport computer 50, and a processing network computer 60. The gateway 40 can be a payments gateway and can be operated by a payment service provider (e.g., PSP) or other entity. In some cases, the functions performed by the gateway 40 itself can be part of the hub computer 10. The transport computer 50 may be operated by an acquirer and the authorizing entity computer 70 can be operated by an issuer.

The service provider computers 20A, 20B, can perform services for the validator systems 26A, 26B, 26C such as fare calculations totaling the fares of multiple legs of journeys for users, fare pricing for journeys using the validator systems 26A, 26B, 26C, etc. In some embodiments, the service provider computers 20A, 20B can be account based ticket fare engines, which receives details of interaction data from various validator systems 26A, 26B, 26C. The interaction data may have been created in response to a user using a user device at each of the validator systems 26A, 26B, 26C. The interaction data from the various validator systems 26A, 26B, 26C can be used to construct a single amount or single fare to be charged to the user. A service provider computer in the service provider computers 20A, 20B can also monitor a balance that a user owes and can make decisions about adding or removing users from deny or approve lists.

The validator systems 26A, 26B, 26C can be systems that are operated by validators. Validators can operate transit systems such as rail systems, bus systems, ferry systems, airplane systems, and the like. Each validator system 26A, 26B, 26C can operate a plurality of validator devices. Examples of validator devices can include gates or readers which can grant or deny physical access to users that use the transit systems of the validators. Each validator system 26A, 26B, 26C can also comprise one or more validator servers. The validator servers can collect and process transactions from validation devices.

The processing network computer 60 can be in a payment processing network, which may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

The components (e.g., the computers) in the system of FIG. 1 and any of the following figures can be in operative communication with each other through any suitable communications medium 150. Suitable examples of the communications medium 150 may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices of FIG. 1 may be transmitted using a secure communications protocol such as, but not limited to, File Transfer Protocol (FTP); HyperText Transfer Protocol (HTTP); and Secure Hypertext Transfer Protocol (HTTPS).

Figure 2:
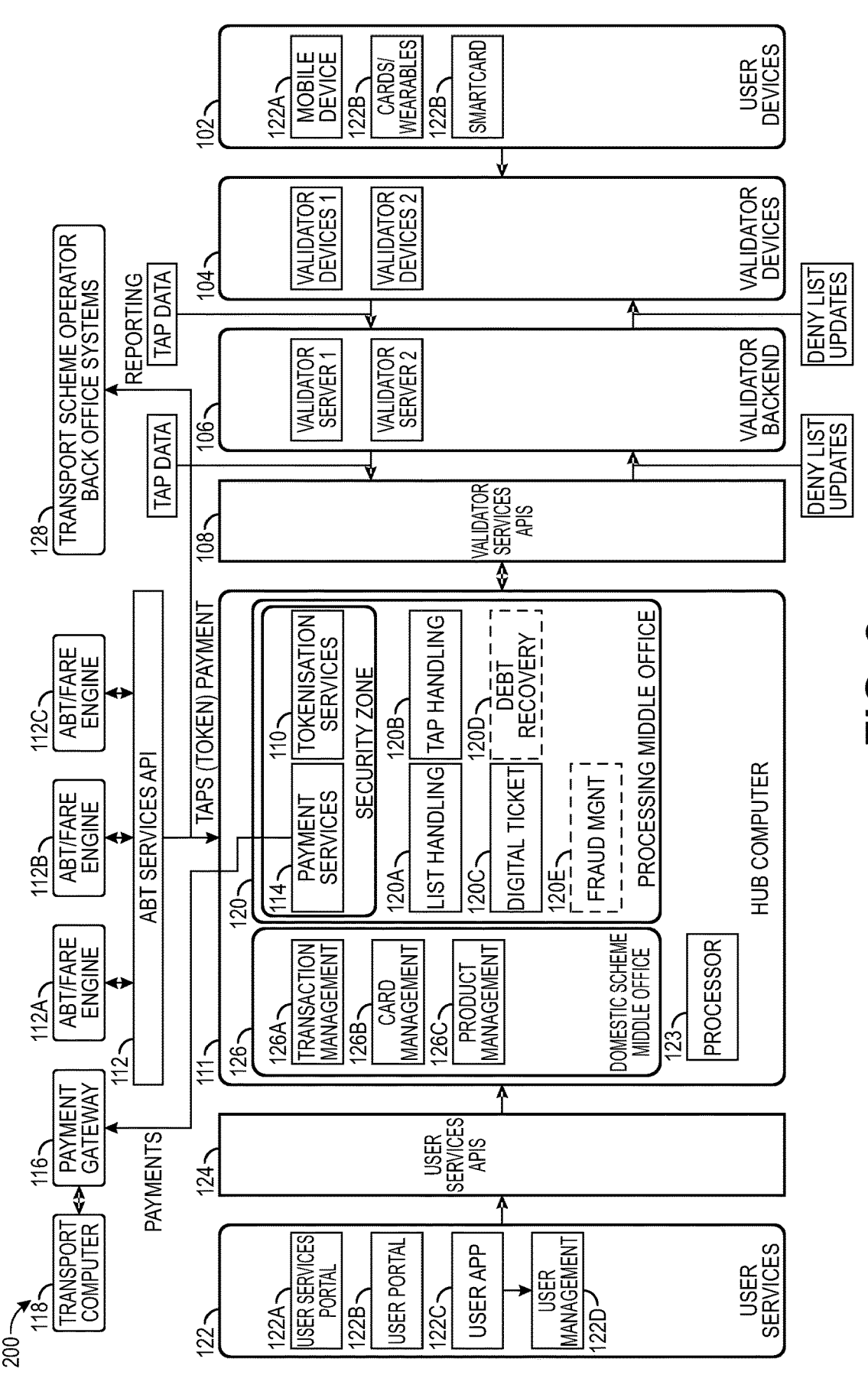
FIG. 2 shows another block diagram of a system according to an embodiment.

FIG. 2 shows a block diagram of core functionalities of a system according to an embodiment. The core functionalities may be embodied by computer software and/or hardware.

FIG. 2 shows a hub computer 111 (e.g., a ticketing hub) which communicates with validator services APIs 108, account based ticketing (ABT) services APIs 112, and user services APIs 124. The hub computer 111 may be part of an integration platform that integrates various service provider computers and validator systems. The validator services API 108 may be a first set of APIs, the ABT services API 112 may be a second set of APIs, and the user services APIs 124 may be a third set of APIs. The APIs 108, 112, and 124 may be part of the hub computer 111 in some embodiments.

The system may further comprise a number of user devices 102, which can be used by users that use the transportation services operated by validators (e.g., transit operators) operating the validator systems. Example user devices include mobile devices 102A (e.g., mobile phones), EMV cards/wearables 102B, and/or a smartcards 102C. In some cases, the user devices 102 can communicate via a short range communication protocol such as NFC (near field communications). They can be tapped to (or otherwise interacted with) a validator device 104 to access transit systems operated by the validators. the validator systems can include validator servers and validator devices.

The validator devices 104 can be devices that users can interact with attempting to use the transit services offered by the validators. Examples of the validator devices can include fare gates, bus ticket machines, etc. The validator devices 104 may be operatively connected to validator backend 106 including validator servers. A validator server may collect and process transactions from one or more validator devices 104 at a location, and can manage communication between the validator devices 104 and the hub computer 111.

In some embodiments, a user can tap a user device 102 (e.g., a credit card) to a validator device 104 (e.g., a fare gate) to access transit services offered by a validator system. When the user device 102 and the validator device 104 are in communication with each other, the user device 102 can transmit a credential (e.g., a PAN) and a digital signature to the validator device 104. The validator device 104 can perform a validation process such as offline authentication process before allowing the user of the user device 102 to access transit services associated with the validator system. In an offline authentication process, the validator device 104 can have a public key that verifies the digital signature from the user device 102. The verification of the digital signature can ensure that the user device 102 is authentic.

The validator services APIs 108 may provide interfaces between the validator backend 106 and the hub computer 111. The validator services APIs 108 may provide an interface for the hub computer 111 to receive interaction data (e.g., an encrypted credential and validator data) from the validator backend 106. The validator services APIs 108 may allow the validator backend 106 to provide updated deny lists to a list handling module 120A.

The hub computer 111 may comprise a processor 123 and several software modules on one or more computer readable media. The software modules may include, but are not limited to, a security zone 115 such as a PCI (payment card industry) zone, a processing middle office 120 (e.g., an EMV middle office), and a domestic scheme middle office 126.

The security zone 115 may comprise a tokenization services module 110 and a payment services module 114. In some embodiments, the tokenization services module 110 can have the same functions as the above-described "token computer" described below with respect to FIGS. 3-6. In some embodiments, the payment services module 114 can be generally referred to as an "interaction processing module." The security zone 115 could be implemented using secure software or hardware (e.g., an HSM or hardware security module). In some embodiments, the tokenization services module 110 may obtain a token that is associated with a credential received from the validator backend 106 via the validator services APIs 108. If a token is not found, then the tokenization services module 110 may obtain (e.g., generate or retrieve) a new token for the credential. In some embodiments, the payment services module 114, upon determining a payment amount, may provide an authorization request message to a transport computer 118. The transport computer 118 can be operated by an acquirer by using the payment gateway 116.

The payment amount may be determined by one or more of the ABT/fare engines 112A, 112B, 112C using the ABT (account based transaction) services API 112, or may be determined by the payment services module 114. In some cases, if the authorization request message fails, then the token used in the authorization request message may be added by the hub computer 111 to a deny list along with the payment amount (debt) that the token failed to authorize.

The processing middle office 120 may comprise modules for list handling 120A, tap handling 120B, digital tickets (VDT) 120C, debt recovery 120D, and fraud management 120E. The list handling module 120A may manage the deny list. The deny list may be a list of tokens or credentials that may not be used to conduct future transactions, because they are inactive or suspected of being fraudulent or stolen. The tap handling module 120B may send the token and the interaction data (e.g., tap data) received from the validator services APIs 108 to the ABT services API 112.

The domestic scheme middle office 126 may comprise modules for transaction management 126A, card management 126B and product management 126C.

In some embodiments, the ABT services API 112, upon receiving the token and the interaction data (e.g., tap data), can distribute one or both of them to an appropriate ABT/fare engine (112A, 112B, 112C). For example, in some cases, the interaction data may be from a validator system such as a bus system, and the token and the interaction data can be sent to an APT service/fare engine associated with the bus system to calculate the cost of a bus ride. In some embodiments, a single ABT/fare engine or single service provider computer can receive interaction data from multiple validator systems via the hub computer 204 at different times during the user's journey. The single ABT/fare engine or single service provider computer can keep track of the data associated with the journey and can calculate a total payment amount and send it to the payment services module 114 after the user has completed their journey. Thus, in embodiments of the invention, different transaction amounts for different transit operators may be aggregated into a single amount, and that single amount may be submitted for authorization in an authorization request message.

The payment services module 114 can initiate the processing and generation of the authorization request message by generating the authorization request message and transmitting to the payment gateway 116, which is in communication with a transport computer, which is in turn in communication with a processing network computer and an authorizing entity computer (see FIG. 1). In other embodiments, the payment services module 114 can provide the data used to create the authorization request message to the payment gateway 116 and the payment gateway 116 can generate and transmit the authorization request message to the authorizing entity computer via the transport computer 118 and the processing network computer. In some embodiments, the function of the payment gateway 116 can be in the payment services module 114.

User services 122 may comprise a user services portal 122A, a user portal 122B, a user application 122C, and a user management module 122D. The user services portal 122A may be a portal typically operated by a customer services agent. The user services portal 122A may typically receive a support phone call from a user, and use the user service portal 122A to respond to queries and make changes. The user portal 122B may be a portal where the user can login and interact with the scheme. The user application 122C may be an application on a user's user device to receive service.

The user services APIs 124 may provide interfaces between the user services 122 and the hub computer 111. The user services APIs 124 may send user requests to amend or refund their journeys from the user services 122 to the hub computer 111. The hub computer 111, upon receiving the requests, may process these requests using the domestic scheme middle office 126.

In some embodiments, the hub computer 111 comprises a processor 123, and a computer readable medium. The computer readable medium comprises code, executable by the processor, for performing operations comprising: receiving, from different validator systems, interaction data for a plurality of interactions conducted by a user on a journey from an initial location to an end location at different validator devices in the different validator systems at different times during the journey; generating an authorization request message comprising a value associated with the interaction data for the plurality of interactions; transmitting the authorization request message to an authorizing entity computer, wherein the authorizing entity computer approves or declines the authorization request message, and then generates an authorization response message; and receiving the authorization response message.

Figure 3:
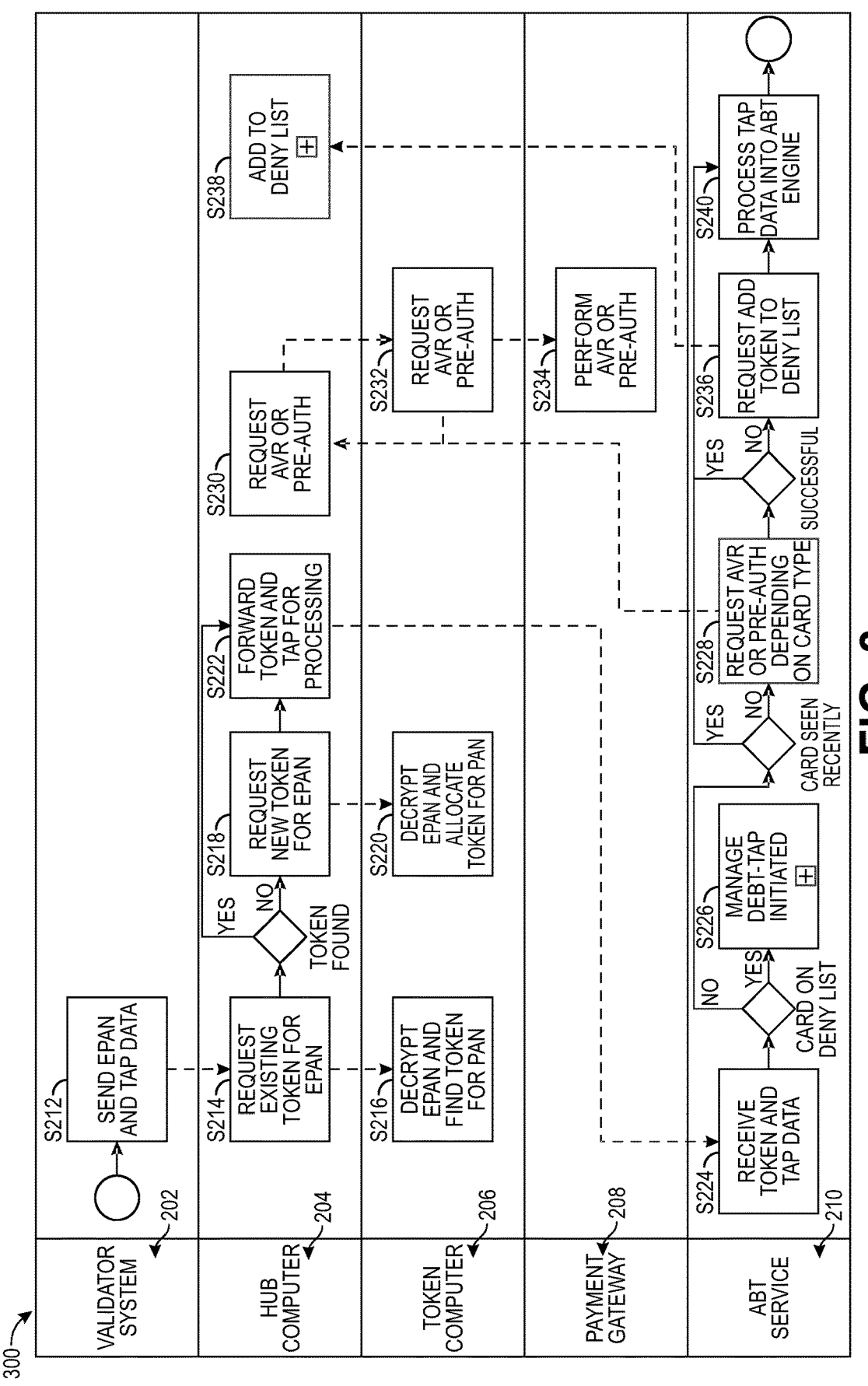
FIG. 3 shows a flow diagram of a process that can occur after a user interacts their user device with a validator device in a validator system operated by a validator.

FIG. 3 shows a flow diagram after a user device interaction with a validator device in a validator system 202. The validator system 202 can be in operative communication with the hub computer 204, a token computer 206 (e.g., a token service computer), a payment gateway 208, and an ABT service 210 (which may be software facilitated or operated by a service provider computer). In some embodiments, the token computer 206 can correspond to the tokenization services module 110 in FIG. 2 and the payment gateway 208 can correspond to the payment services module 114 and/or the payment gateway 116 in FIG. 2.

Prior to a user conducting a transaction with the validator system 202, the hub computer 204 (or the token computer 206) and the validator system 202 can establish a cryptographic kay pair to secure communications between them. In some embodiments, the validator system 202 (e.g., either the validator device or the validator server) can encrypt credentials received from user devices before they are sent to the hub computer 204. Each validator system 202 that interacts with the hub computer 204 can have a separate cryptographic key pair so that communications between the hub computer 204 (or token computer associated with the hub computer) and the respective validator systems are secure. The cryptographic key pair can be a symmetric key pair or an asymmetric key pair.

In the process associated with FIG. 3, a can user tap or otherwise interact a user device such as a payment card (e.g., an EMV card) with a validator device (e.g., a train station gate) in the validator system 202. During the interaction, the validator device can receive a credential such as a primary account number (PAN), and other information including one or more of an expiration date, CVV (card verification value), digital signature, and a cryptogram. The validator device can then provide the user device data including the credential along with the other data relating to the user device interaction with the validator device to a validator server in the validator system, or to the hub computer 204. The data relating to the user device interaction may include information such as the location of the validator device (e.g., Times Square subway station), an identifier for the validator device, and a time when the validator device received the credential from the user device. The data relating to the user device interaction and the credential can be part of "interaction data" (or alternatively referred to as "tap data" in the case where an NFC communication is used) for that user device interaction with the validator device in the validation system 202.

In step S212, after receiving the credential from the user device, the validator device or the validator server in the validator system 202 may encrypt the credential with a first key (e.g., a symmetric key or a public key) of a cryptographic key pair, and send the encrypted credential (e.g., ePAN) and other interaction data to the hub computer 204. Examples of other interaction data can include operator information such as a validator device ID and/or a validator system ID, a time, a location. In some embodiments, the interaction data can also include one or more of the encrypted credential, cleartext data (e.g., cleartext EMV data), a hashed credential (e.g., a hashed PAN), a digital signature, and an interaction identifier (e.g., a tap UID). Other examples of interaction data can include a mode of transportation (e.g., bus, rail), a destination, a tap type (e.g., entry, exit, inspection, etc.), etc. Although not shown in FIG. 2, the hub computer 204 may receive the encrypted credential by using a first set of APIs.

In step S214, after receiving the interaction data from the validator system 202, the hub computer 204 may request an existing token for the encrypted credential by sending the encrypted credential to the token computer 206. The token computer 206 may be part of the hub computer 204 or may be external to the hub computer 204.

In step S216, the token computer 206 may decrypt the encrypted credential using a second key of the cryptographic key pair. Once decrypted, the token computer 206 can exchange (e.g., determine) an existing token for the credential. If the token exists, then the token is sent back to the hub computer 204. If the token does not exist, then the token computer 206 informs the hub computer 204 that the token does not exist. The token computer 206 can be referred to as a token service computer or a tokenization services module in some embodiments, and can maintain a database with mappings between credentials (e.g., PANs) and tokens.

In step S218, if the token does not exist, the hub computer 204 requests a new token for the encrypted credential to the token computer 206.

In step S220, the token computer 206, upon receiving the request, may decrypt the encrypted credential using the second key (associated with the first key), obtain a token for the credential, and send the token to the hub computer 204.

In step S222, once the hub computer 204 obtains the token, the hub computer 204 forwards the token and the interaction data to the ABT service 210 for processing.

In step S224, the ABT service receives the token and the interaction data and checks whether the token is in a deny list. The ABT service 210 may be a module that is implemented on a service provider computer. The service provider computer can have a deny list (and/or an approve list) of tokens that are not approved to conduct transactions. They may not be approved to conduct transactions for a number of reasons. For example, the credential associated with a token may be suspected of being fraudulently obtained, or the credential may be associated with an overdrawn or suspended account.

Figure 6:
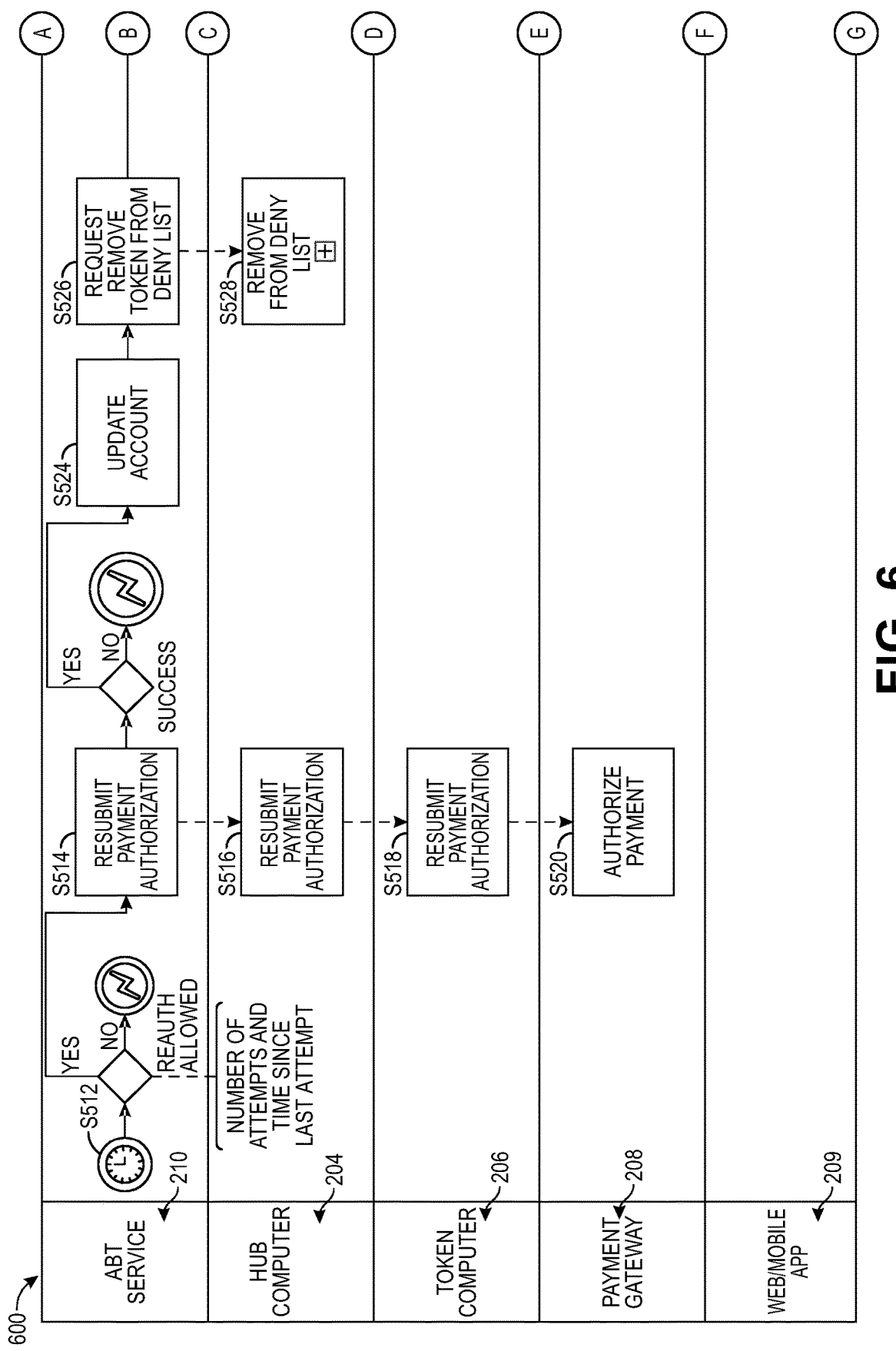
FIG. 6 shows a flow diagram of managing debt initiated by operators.
Figure 6:
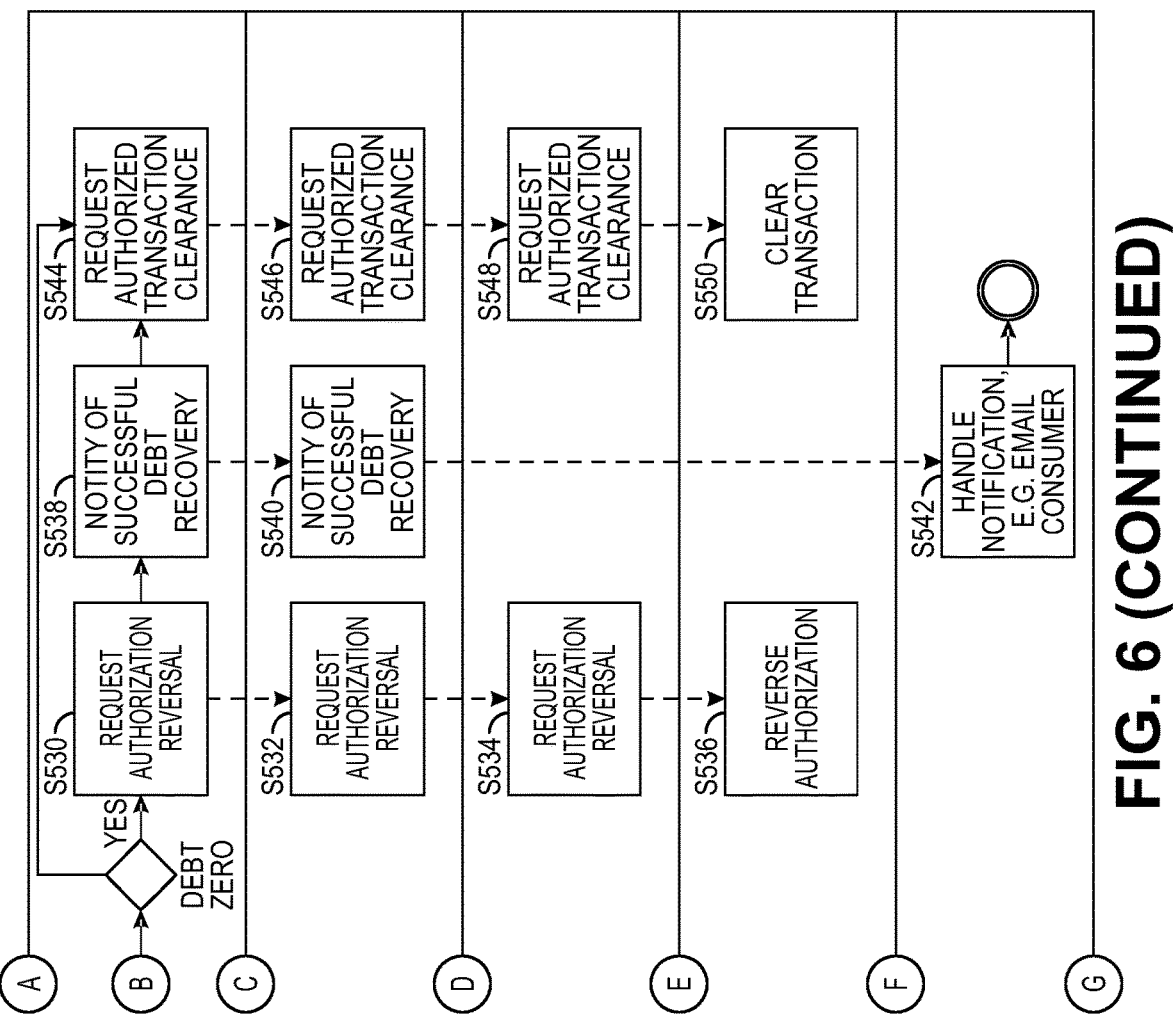

In step S226, if the token is in the deny list, then a module for managing debt is initiated similar to the process described with respect to FIG. 6.

If the token is not in the deny list, then the token is analyzed to determine if the token has been recently used. In step S228, if the token has not been used recently, then the ABT service 210 sends an account verification request (AVR) or a pre-authorization request with the token to the hub computer 204. The account verification request can be a request to an authorizing entity computer to verify that an account associated with the credential associated with the token is in good standing and is valid. The pre-authorization request message can request pre-authorization for a predetermined amount sufficient to pay for the current or future trip on the transit system associated with the validator system 202. For example, if the cost of the most expensive journey on a transit system is one hundred dollars, then the pre-authorization request message may request authorization to hold one hundred dollars on the user's account. When the user finishes the leg of their journey on the transit services associated with the validator system 202, the hold can be released and the cost of the journey can be settled for the actual amount of the journey leg.

In step S230, the hub computer 204 then generates and sends an AVR request message or pre-authorization request message including the token to the token computer 206.

In step S232, the token computer 206 sends the received AVR request message or pre-authorization request message with the credential instead of the token to the payment gateway 208.

In step S234, the payment gateway may process the AVR or pre-authorization request message, and notifies the ABT service 210 if it successfully processes the request. The payment gateway may process the AVR or the pre-authorization request message with an authorizing entity computer associated with the token through an acquirer (not shown in FIG. 3, but shown in FIG. 1). In some embodiments, the acquirer may hold an account associated with an operator operating the hub computer 204 or an account associated with a transit operator operating the validator system 202.

In step S236, if the AVR or the pre-authorization request message is not successful or not approved, then the ABT service 210 may request the token to be added to the deny list to the hub computer 204. In step S238, the hub computer 204 adds the token to the deny list.

In step S240, if the token has been used recently or the request has been successfully processed, the ABT service 210 may process the interaction data with an appropriate ABT/fare engine. For example, the ABT service 210 and the ABT/fare engine can provide an amount of a leg of a user's journey to the hub computer 204. Alternatively, or additionally, it can keep track of the cost of all of the user's use of different validator systems along the user's journey, and can determine a total cost of the journey. The total cost can be provided to the hub computer 204 in some embodiments.

The process illustrated in FIG. 3 can be performed by each validator system as the user interacts with it during legs of the user's journey from an initial location to an end location. Once the user has completed their journey on the different transit systems associated with the different validator systems, a single authorization process can be performed for the user and their journey on the different transit systems. The hub computer can receive, from different validator systems, interaction data for a plurality of interactions conducted by a user on a journey from an initial location to an end location at different validator devices in the different validator systems at different times during the journey.

Figure 4:
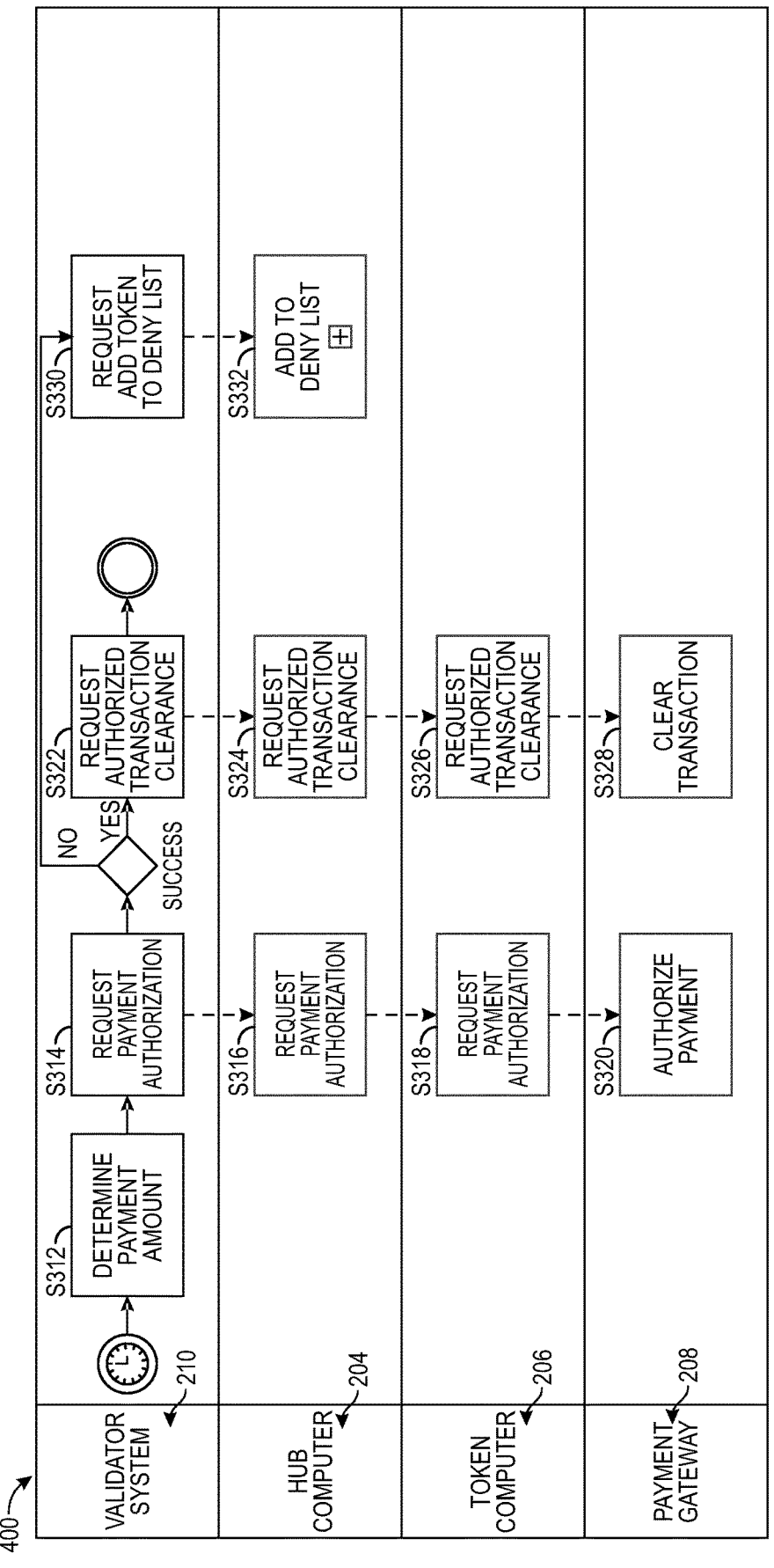
FIG. 4 shows a flow diagram of performing an end of travel period processing.

FIG. 4 shows a flow diagram of performing an end of travel period processing for a user that has completed a journey with multiple legs associated with multiple validator systems. The end of travel period processing may be a batch process during which an ABT service 210 may determine the payment amount for each account in the scheme and take the required payment.

In step S312, at the end of travel, the ABT service 210 may determine a total payment amount for a token used for travel. The total amount may be determined by adding fares collected by the ABT/fare engine from different validator systems in the method of FIG. 3.

In steps S314 and S316, the ABT service 210 may send a payment authorization request with the token to the hub computer 204. In step S318, the hub computer 204 may then generate and/or send a payment authorization request message with the token to the token computer 206, which may retrieve the credential associated with the token. The token computer 206 may then send the payment authorization request message comprising the credential to the payment gateway 208 (e.g., with the secure payment services module 114 in FIG. 2).

In step S320, the payment gateway 208 may continue the payment authorization process and can obtain authorization for the payment and notify the ABT service 210. In some embodiments, the payment gateway 208 (or the secure payment services module 114 in FIG. 2) can generate (or forward) an authorization request message with the total amount and the credential and can transmit it to an authorizing entity computer via a transport computer (e.g., an acquirer computer) and a processing network computer (e.g., a computer in a payment processing network). The value in the authorization request message can be based on a sum of values associated with the different validator systems. The hub computer 204 or the service provider computer determines (e.g., calculates) the value based on the values associated with the different validator systems.

After authorizing the authorization request message, the authorizing entity computer can generate and transmit an authorization response message back to the hub computer 204 via the transport computer and the processing network computer.

In step S322, if the payment authorization is successful by the payment gateway 208, then the ABT service 210 may send a transaction clearance request comprising the token to the hub computer 204.

In steps S324 and S326, the hub computer 204 may then send the transaction clearance request to the token computer 206, which may look up the credential associated with the token. The token computer 206 may send the transaction clearance request to the payment gateway 208.

In step S328, the payment gateway 208 may clear the transaction using the credential and can notify the ABT service 210 that the transaction has been cleared. The payment gateway 208 can clear the transaction by initiating the transmission of clearing and settlement communications between a transport computer, the authorizing entity computer associated with the user's credential, and a processing network computer. In some embodiments, actual funds can be transferred from the authorizing entity computer to the transport computer via the processing network computer. The transport computer can be an acquirer computer which may hold an account associated with the hub computer 204 or accounts associated with the validators. In some embodiments, the funds for the user's journey are transferred to an account of the hub computer 111. The hub computer can thereafter transfer the funds for the respective legs of the user's journey to the accounts associated with the different validators.

In step S330, if the payment authorization is not successful, then the ABT service 210 may provide a request to add the token to the deny list to the hub computer 204. Then, in step S332, the hub computer 204 can add the token to the deny list.

Figure 5:
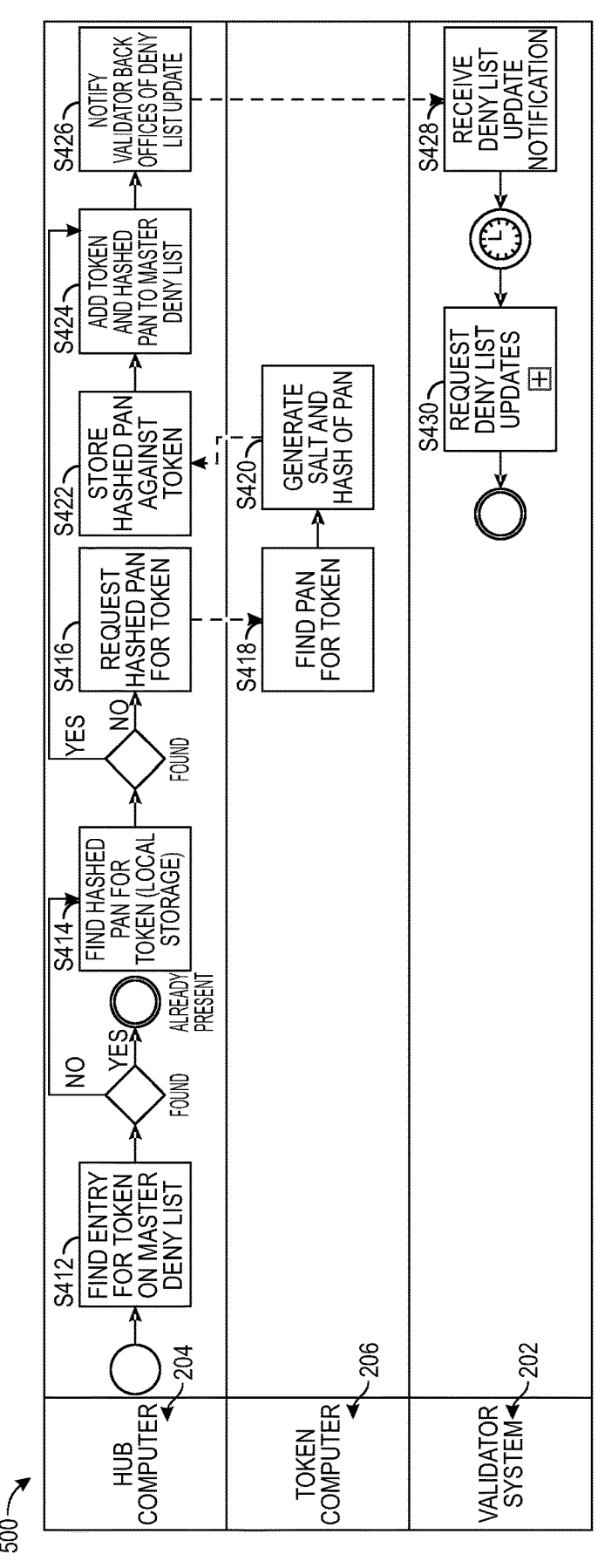
FIG. 5 shows a flow diagram of adding a user to a deny list.

FIG. 5 shows a detailed flow diagram of adding a token to a deny list.

In step S412, upon receiving a request to add a token to a deny list, the hub computer 204 may try to find the token in the deny list.

In step S414, if the token is not found in the deny list, the hub computer 204 may try to find a hashed credential associated with the token.

In step S416, if the hashed credential is not found, then the hub computer 204 may send a request to generate a hashed credential for the token to the token computer 206.

In step S418, the token computer 206 may determine a credential associated with the token. In step S420, the token computer 206 may hash the credential to generate a hashed credential and send the hashed credential to the hub computer 204.

In step S422, the hub computer 204 may store the hashed credential with the token.

In step S424, the hub computer 204 may add the token and the hashed credential to the deny list.

In step S426, the hub computer 204 may notify the validator system 202 of the updated deny list. In step S428, the validator system 202 may receive the updated deny list notification with the updated deny list. In step S430, the validator system 202 may provide requests deny list updates to the hub computer 204.

FIG. 6 shows a flow diagram of managing debt initiated by an operator. These are the debts collected by the operator from users of tokens that failed authorizations. An ABT service 210, a hub computer 204, a token computer 206, a payment gateway 208, and a mobile app 209 may be in operative communication with each other. The ABT service 210 may use a second set of APIs, the hub computer 204 may include a server computer, and the token computer 206 may include a token service computer.

In step S512, the ABT service 210 may perform an automatic attempt at debt recovery for an authorization that previously failed. In step S514, if re-authorization is allowed, the ABT service 210 may resubmit the payment authorization request to the hub computer 204.

In steps S516 and S518, the hub computer may resubmit payment authorization request message with the token to the token computer 206. The token computer 206 may then resubmit the payment authorization request with the credential corresponding to the token to the payment gateway 206.

In step S520, the payment gateway may generate an authorizing request message requesting authorization of the payment request (similar to step S320 in FIG. 4).

In step S524, if the payment is successfully authorized, then the ABT service 210 may update an account associated with the token that the payment is successfully authorized.

In step S526, the ABT service 210 may provide a request to remove the token from a deny list to the hub computer 204. In response to this request, in step S528, the hub computer 204 may remove the token from the deny list.

In step S530, if the debt is zero, then the original authorization that was initially declined is reversed as there is no debt that the ABT service 210 can charge to the user's account. The authorization reversal request may be sent from the ABT service 210 to the hub computer 204.

In steps S532 and S534, the hub computer 204 may send authorization reversal request message with the token to the token computer 206. The token computer 206 may then send the authorization reversal request message with the credential to the payment gateway 208.

In step S536, the payment gateway may reverse the authorization and notify the ABT service 210 of the reversal.

In step S544, the ABT service 210 may submit a transaction clearance request with the token to the hub computer 204. In steps S546 and S548, the hub computer 204 may send the transaction clearance request to the token computer 206, which can determine the credential associated with the token. The token computer 206 may send the transaction clearance request with the credential to the payment gateway 208. In step S550, the payment gateway 208 may clear the transaction with the credential, and notify the ABT service of the cleared transaction. Steps S544, S546, S548, and S550 can be similar to steps S322, S324, S326, and S328 in FIG. 4.

In steps S538 and S540, the ABT service 210 may provide a notification of successful debt recovery to the hub computer 204, and the hub computer 204 may notify the mobile application 209. In step S542, the mobile application may manage notifications to a user of the token (e.g., an email, text message, etc.).

Figure 7:
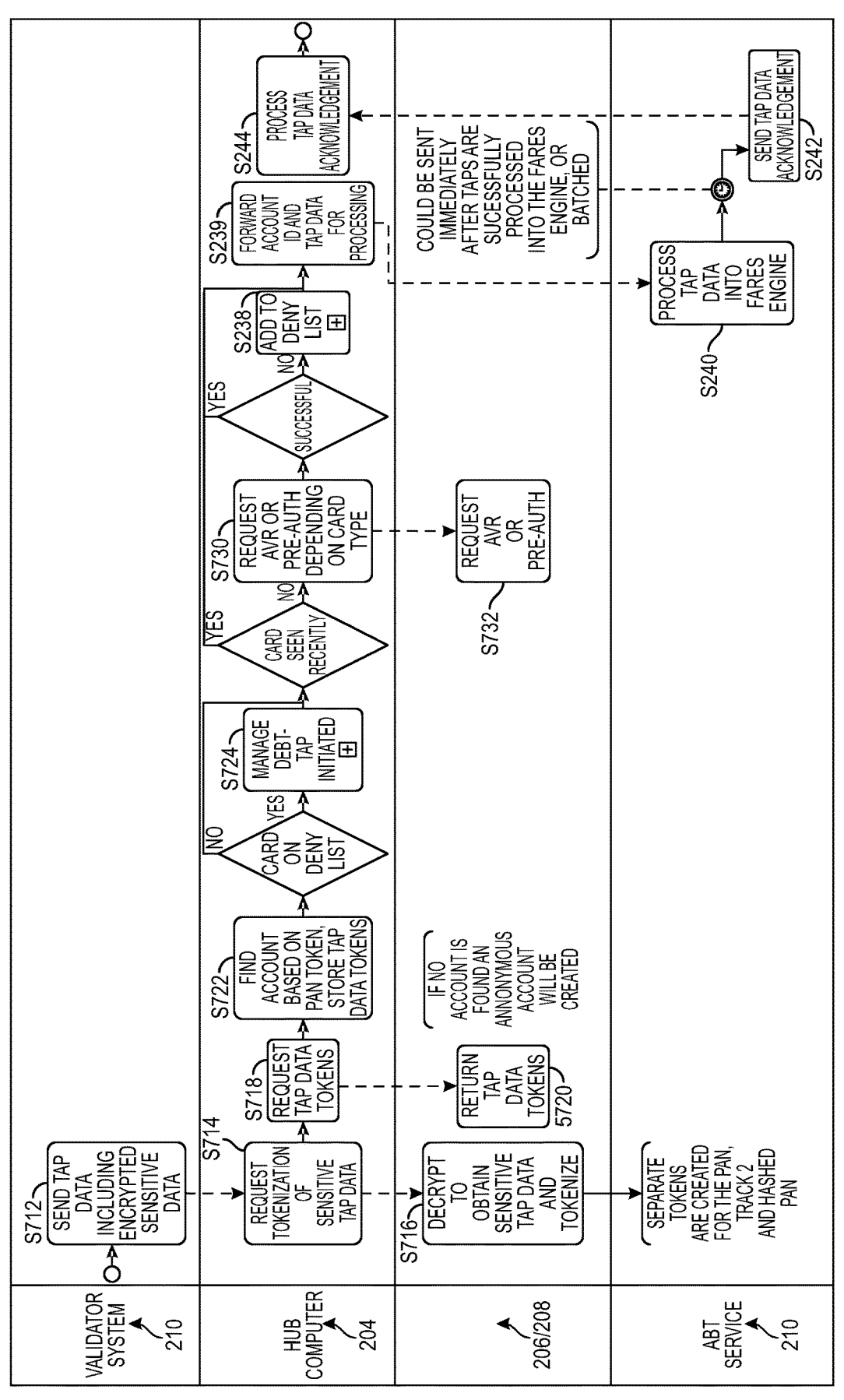
FIG. 7 shows a flow diagram of another process that can occur after a user interacts their user device with a validator device in a validator system operated by a validator.

FIG. 7 shows a flow diagram after a user device interaction with a validator device in a validator system 202. The validator system 202 can be in operative communication with the hub computer 204, a token computer 206 (e.g., a token service computer or a token vault computer) and payment gateway 208, and an ABT service 210 (which may be software facilitated or operated by a service provider computer). In some embodiments, the token computer 206 can correspond to the tokenization services module 110 in FIG. 2 and the payment gateway 208 can correspond to the payment services module 114 and/or the payment gateway 116 in FIG. 2.

As in the embodiment in FIG. 3, in FIG. 7, prior to a user conducting a transaction with the validator system 202, the hub computer 204 (or the token computer 206) and the validator system 202 can establish a cryptographic kay pair to secure communications between them. In some embodiments, the validator system 202 (e.g., either the validator device or the validator server) can encrypt credentials received from user devices and validator data from the validator system 202 before they are sent to the hub computer 204. Each validator system 202 that interacts with the hub computer 204 can have a separate cryptographic key pair so that communications between the hub computer 204 (or token computer associated with the hub computer) and the respective validator systems are secure. The cryptographic key pair can be a symmetric key pair or an asymmetric key pair.

In the process associated with FIG. 7, a can user tap or otherwise interact a user device such as a payment card (e.g., an EMV card) with a validator device (e.g., a train station gate) in the validator system 202. During the interaction, the validator device can receive a credential such as a primary account number (PAN), and other information including one or more of an expiration date, CVV (card verification value), digital signature, and a cryptogram. The validator device can then provide the user device data including the credential along with the other data (e.g., validator data) relating to the user device interaction with the validator device to a validator server in the validator system, or to the hub computer 204. The data relating to the user device interaction may include information such as the location of the validator device (e.g., Times Square subway station), an identifier for the validator device, and a time when the validator device received the credential from the user device. The data relating to the user device interaction and the credential can be part of "interaction data" (or alternatively referred to as "tap data" in the case where an NFC communication is used) for that user device interaction with the validator device in the validation system 202.

In step S712, after receiving the credential from the user device, the validator device or the validator server in the validator system 202 may encrypt the credential with a first key (e.g., a symmetric key or a public key) of a cryptographic key pair, and send the encrypted credential (e.g., ePAN) and other interaction data (e.g., validator data) to the hub computer 204. Examples of other interaction data can include operator information or validator data such as a validator device ID and/or a validator system ID, a time, a location). In some embodiments, the interaction data can also include one or more of the encrypted credential, cleartext data (e.g., cleartext EMV data), a hashed credential (e.g., a hashed PAN), a digital signature, and an interaction identifier (e.g., a tap UID). Other examples of interaction data can include a mode of transportation (e.g., bus, rail), a destination, a tap type (e.g., entry, exit, inspection, etc.), etc.

In step S714, after receiving the interaction data from the validator system 202, the hub computer 204 may request an existing payment token for the encrypted credential by sending the encrypted credential to the token computer 206. The token computer 206 may be part of the hub computer 204 or may be external to the hub computer 204.

In step S716, the token computer 206 may decrypt the encrypted credential and any other interaction data (e.g., validator data) encrypted using a second key of the cryptographic key pair. Once decrypted, the token computer 206 can determine (e.g., exchange) a payment token for the credential and provide it to the hub computer 204. If the payment token exists, then the payment token is sent back to the hub computer 204. If the payment token does not exist, then the token computer 206 informs the hub computer 204 that the payment token does not exist and it may generate the token for the hub computer. The token computer 206 can be referred to as a token service computer or a tokenization services module in some embodiments, and can maintain a database with mappings between the interaction data (e.g., PANs) and tokens.

In step S718, the hub computer 204 can also request an interaction data token (e.g., a tap data token) for the various elements of the interaction data (e.g., tap data). For example, an interaction data token can be a string of characters that represents the collection of interaction data including the credential and the validator data (e.g., the time that of the current trip, a transit system name, etc.).

Although steps S714 and S718 are shown as separate steps, they can be combined into a single request in some embodiments.

In step S720, the token computer 206 can obtain (e.g., generate or retrieve) the tokenized interaction data (e.g., an interaction data token) and can send it to the hub computer 204.

In step S722, the hub computer 204 can locate a user account associated with the credential, and then can store the payment token and the interaction data token with the user account data. The user account can be managed by the hub computer, and can have an account identifier associated with it. If no account identifier is located, then an account identifier can be created for the user. Note that in some embodiments, one account identifier is created for each credential that is used by the user. For example, if the user uses two different payment cards to access different transit systems that communicate with the hub computer 204, then the hub computer 204 could maintain two different accounts with two different account identifiers for the user.

Then, the hub computer 204 can determine if the credential is on a deny list. If it is, then a debt management process such as the one that will be described with respect to FIG. 10 can be performed.

If the credential is not on a deny list, then another decision can be made as to whether or not the credential has been recently received by the hub computer 204. If the credential has not been recently received (e.g., in the past few days, week or two weeks, or month), then an account verification process or a pre-authorization request process can be performed as in steps S730 and S732. Further details regarding these processes are described above in FIG. 3. If the account verification process and/or a pre-authorization request process are not successful, then in step S738, the credential can be added to a deny list and the processing associated with FIG. 9 (which is described below) can take place.

If the credential has been recently received by the hub computer 204, or if the account verification process and/or a pre-authorization request process are successful, then in step S739, the hub computer 204 can send the user account identifier and the interaction data (e.g., validator data) including data relating the leg of the user's journey to the ABT service 210 for processing. In step S740, the interaction data can be used by the ABT service 210 to determine the appropriate fare(s) and this can be stored with the user account identifier and the interaction data. In step S742, the ABT service 210 can send an interaction data acknowledgement and it can be received and processed by the hub computer 204 in step S744.

The process illustrated in FIG. 7 can be performed by each validator system as the user interacts with it during legs of the user's journey from an initial location to an end location. Once the user has completed their journey on the different transit systems associated with the different validator systems, a single authorization process can be performed for the user and their journey on the different transit systems. The hub computer can receive, from different validator systems, interaction data for a plurality of interactions conducted by a user on a journey from an initial location to an end location at different validator devices in the different validator systems at different times during the journey.

Figure 8:
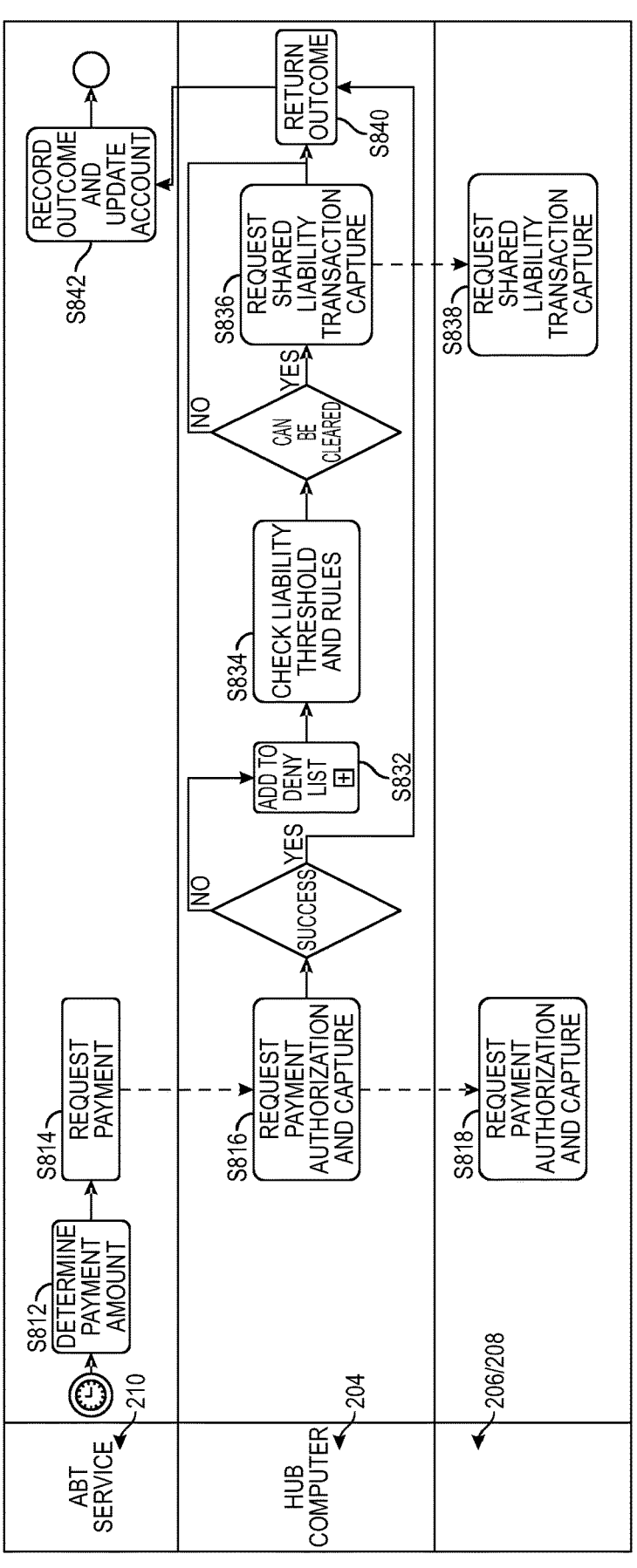
FIG. 8 shows a flow diagram of performing another end of travel period processing.

FIG. 8 shows a flow diagram of performing an end of travel period processing for a user that has completed a journey with multiple legs associated with multiple validator systems according to another embodiment. The end of travel period processing may be a batch process during which an ABT service 210 may determine the payment amount for each account in the scheme and obtain the required payment.

In step S812, at the end of travel, the ABT service 210 may determine a total payment amount for a token used for travel. The total amount may be determined by adding fares collected by the ABT/fare engine from different validator systems in the method of FIG. 7.

In step S814, ABT service may send a payment request to the hub computer 204. The payment request can include at least the account identifier (that was received in step S739 and the total amount, and other interaction data such as an interaction identifier.

In step S816, the hub computer 204 can determine the account of the user based on the account identifier. Once the account is determined, the hub computer 204 can retrieve the payment token and any other data need to conduct a payment transaction (e.g., a CVV value, an expiration date, an identifier for the validator, etc.). It can then generate and transmit an authorization request message comprising the payment token, the total amount, and any other relevant information to the token computer 206.

The token computer 206, which may retrieve the credential associated with the payment token, and send the payment authorization request comprising the credential to a payment gateway (e.g., with the secure payment services module 114 in FIG. 2).

The payment gateway 208 may continue the payment authorization process and can obtain authorization for the payment. In some embodiments, the payment gateway 208 (or the secure payment services module 114 in FIG. 2) can generate (if it was not generated by the hub computer 204) an authorization request message with the total amount and the credential and can transmit it to an authorizing entity computer via a transport computer (e.g., an acquirer computer) and a processing network computer (e.g., a computer in a payment processing network). The value in the authorization request message can be based on a sum of values associated with the different validator systems. The hub computer 204 or the service provider computer determines (e.g., calculates) the value based on the values associated with the different validator systems.

After authorizing the authorization request message, the authorizing entity computer can generate and transmit an authorization response message back to the payment gateway via the transport computer and the processing network computer.

In step S832, if the payment authorization process is not successful, then in step S832, the credential and/or token can be added to a deny list. In step S834, the hub computer 204 can also check liability and threshold rules, and a decision can be made as to whether the transaction can be cleared or not. If it can, then in steps S836 and S838, the hub computer 204 and the token computer 206 can request shared liability transaction capture.

An outcome is returned in step S840 after successful transaction authorization in step S816 or if the transaction cannot be cleared. The outcome is then reported by the hub computer 204 to the ABT service 210.

As noted above, a clearing and settlement process can occur at a later time.

Figure 9:
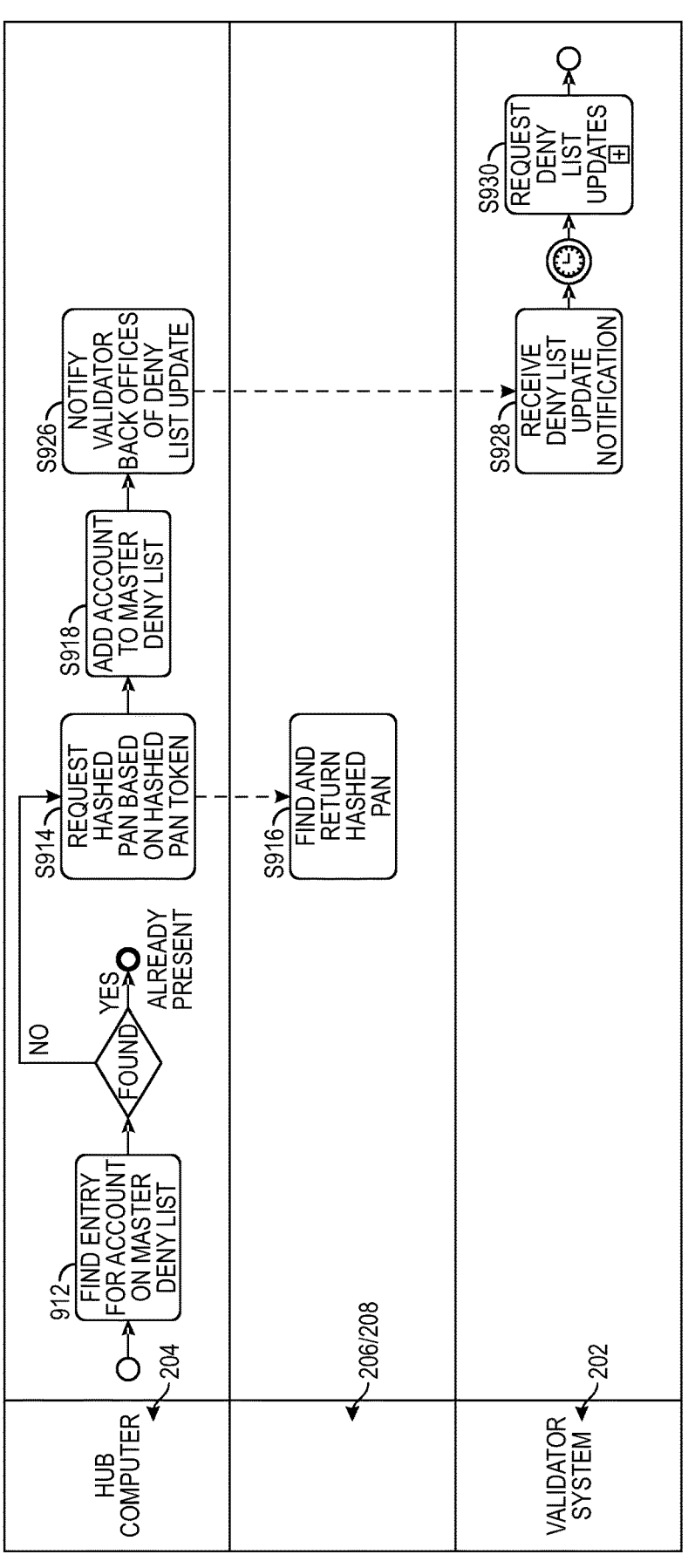
FIG. 9 shows a flow diagram of another process for adding a user to a deny list.

FIG. 9 shows another flow diagram of adding a token to a deny list.

In step 912, upon receiving a request to add a token or credential to a deny list, the hub computer 204 may try to find the token or the credential in the deny list.

In step 914, if the token or the credential is not found in the deny list, the hub computer 204 may request a hashed credential (e.g., a hashed PAN) from the token computer 206, and the token computer 206 can return the hashed credential to the hub computer 204 in step S916. The hub computer 204 may then store the hashed credential with the token and the user account identifier.

In step S918, the hub computer 204 may add the user account including the token and the hashed credential to the deny list.

In step S926, the hub computer 204 may notify the validator system 202 of updating the deny list. In step S928, the validator system 202 may receive the updated deny list notification. In step S930, the validator system 202 may provide a request to update the deny list.

Figure 10:
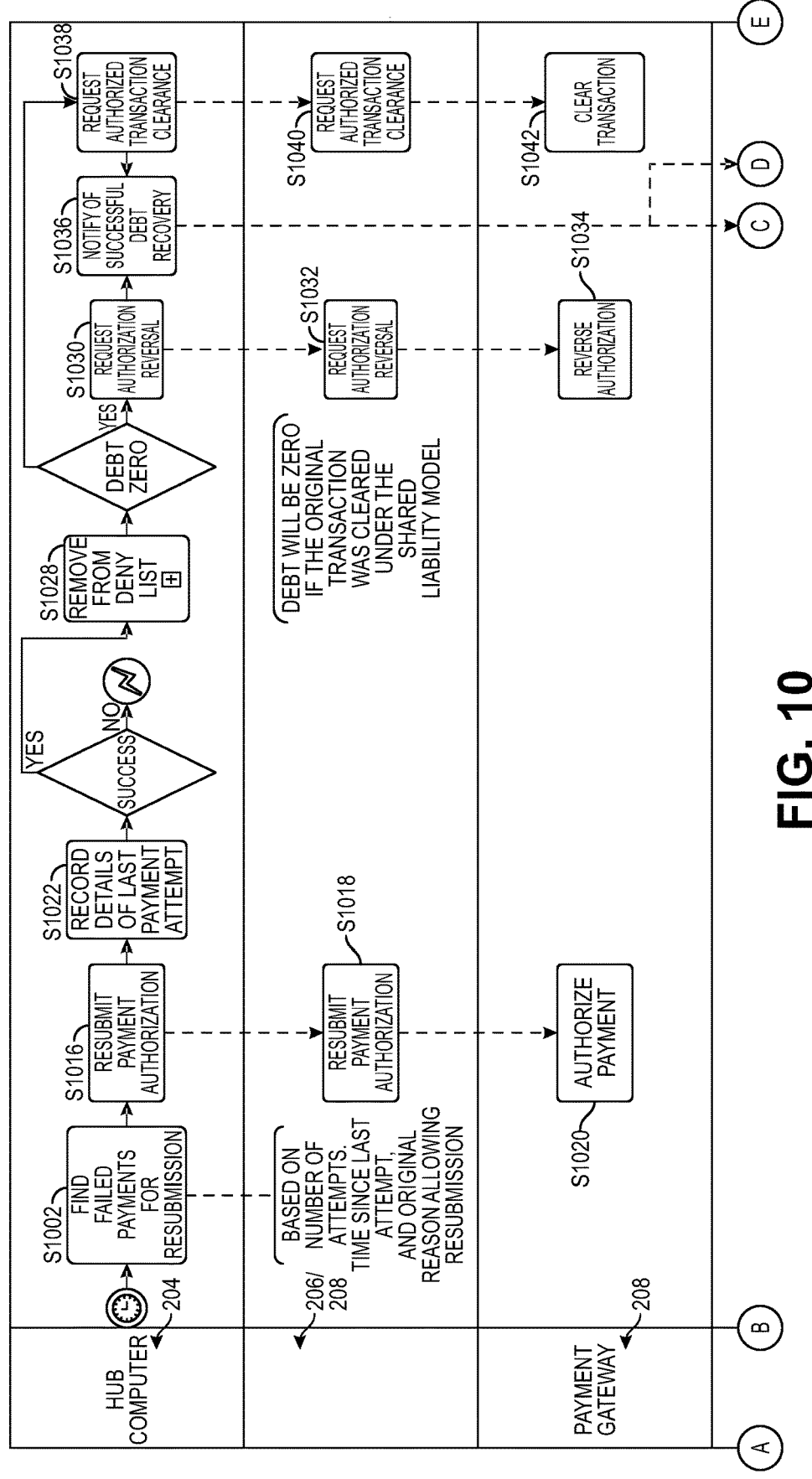
FIG. 10 shows a flow diagram of another process for managing debt initiated by operators.
Figure 10:
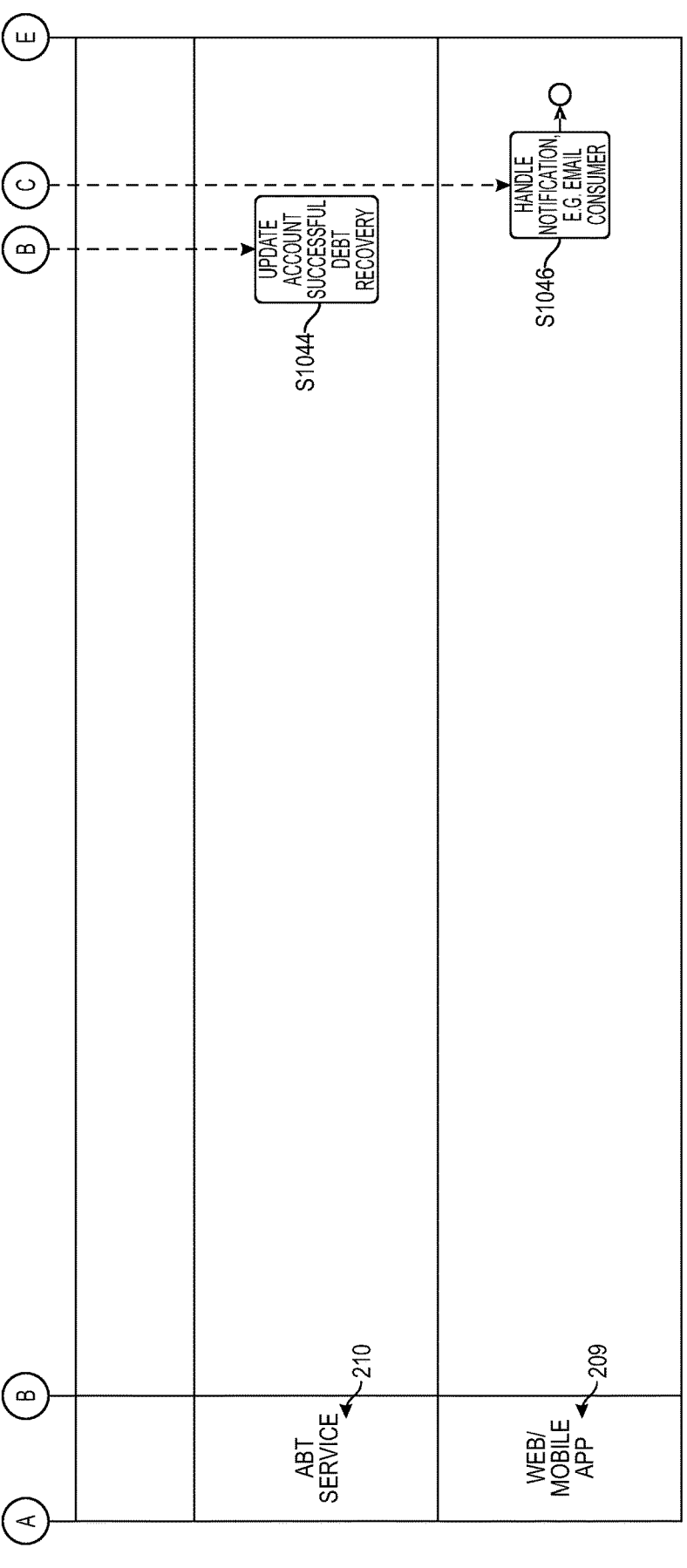

FIG. 10 shows another flow diagram of managing debt initiated by an operator. These are the debts collected by the operator from transactions conducted by users that had failed authorizations.

In step S1002, the hub computer 204 can find failed payments for resubmission.

In steps S1016, S1018, and S1020, the hub computer 204 may resubmit payment authorization request to the token computer 206, and the token computer 206 may resubmit the payment authorization request to the payment gateway 206.

In step S1022, the hub computer 204 can record details of the last payment attempt.

In step S1028, if the payment is successfully authorized, then the hub computer 204 may remove the token from the deny list.

In step S1030, S1032, and S1034, if the debt is zero, then the original authorization that was initially declined is reversed as there is no debt to be charged to the user's account. The hub computer 204 may send authorization reversal request to the token computer 206, and the token computer 206 may send the authorization reversal request to the payment gateway 208.

In step S1036, the hub computer 210 may notify the ABT service 210 of the reversal. In step S1044, the ABT service 1044 can update the user's account with an indication of a successful debt recovery.

In step S1038, the hub computer 204 may submit a transaction clearance request with the token to the token computer 206, which can determine the credential associated with the token. In step S1040, the token computer 206 may send the transaction clearance request with the credential to the payment gateway 208, which may clear the transaction in step S1042.

Embodiments of the invention have a number of technical advantages. For example, in the above described method, a single authorization request message can be used to charge a user for a multi-leg journey on different validator systems. By doing so, the user only sees a single amount for the multi-leg journey, rather than multiple charges for the multiple legs of the journey. This reduces the number of messages and the processing systems relative to the conventional transit ticketing and payment systems.

Also, as will be apparent from the description above, embodiments of the invention allow for standard interfaces for different validator systems, different service provider systems, and different user service systems (e.g., customer service systems). This allows new validator systems to easily integrate with the hub computer. Significant infrastructure changes are not required before new entities can integrate to the hub computer.

Stated differently, one advantage of the embodiment is that by creating an integration platform where all operator systems are connected, a user can use a EMV card to pay fares for all the operator systems with the integration platform. Another advantage of the embodiment is that both the EMV and non-EMV ticketing systems are supported in a single integration platform, thereby reducing complexity of a payment system.

Further, as will be explained above, each validator system can still maintain their own deny lists which can be updated in real time while communicating with the hub computer. This can also be done, while protecting sensitive credentials (e.g., payment account numbers) associated with the users, and the validator systems and the services providers would be out of scope of PCI (payment card industry) compliance. Specific encryption and tokenization processes can be used to provide for such advantages. Note that in the process flows described above, the validators do not retain plaintext credentials, but encrypts credentials after they are received and the encrypted credentials are transmitted to a secure environment in the hub computer. The subsequent processing of the transactions for the legs of the user's journey can be conducted using a token, thereby further protecting the plaintext credentials. The validator systems and the service provider computers can use tokens, hashed versions of the credentials, and non-sensitive account identifiers to request authorizations, clearances, perform account validation checks, update deny lists, etc. As such, journeys involving multiple validators and separate ticketing service providers can be efficiently and securely conducted.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:

receiving, by a hub computer from a first validator system including a first validator device after a user interacts a user device comprising a credential with the first validator device to conduct a first leg of a journey, an encrypted credential and first interaction data associated with the journey, the encrypted credential being the credential that is encrypted with a first cryptographic key of a first cryptographic key pair;

sending, by the hub computer to a token computer, the encrypted credential, wherein the token computer decrypts, using a second cryptographic key in the first cryptographic key pair corresponding to the first cryptographic key, the encrypted credential to obtain the credential, and exchanges the credential for a payment token, the payment token being a substitute for the credential;

receiving, by the hub computer from the token computer, the payment token;

transmitting, by the hub computer, the payment token and the first interaction data to a first ABT (account based transaction) computer, wherein the first ABT computer determines that the payment token has been verified, the payment token is not on a first deny list, and a first value associated with the first leg of the journey;

receiving, by the hub computer from the first ABT computer, the first value;

receiving, by the hub computer from a second validator system including a second validator device after the user interacts the user device comprising the credential with the second validator device to conduct a second leg of the journey, an encrypted credential and second interaction data associated with the journey, the encrypted credential being the credential that is encrypted with a third cryptographic key of a second cryptographic key pair;

sending, by the hub computer to the token computer, the encrypted credential, wherein the token computer decrypts, using a fourth cryptographic key in the second cryptographic key pair corresponding to the third cryptographic key, the encrypted credential to obtain the credential, and exchanges the credential for the payment token;

receiving, by the hub computer, the payment token;

transmitting, by the hub computer, the payment token and the second interaction data to a second ABT (account based transaction) computer, wherein the second ABT computer determines that the payment token has been verified, the payment token is not on a second deny list, and a second value associated with the second leg of the journey;

receiving, by the hub computer from the second ABT computer, the second value;

providing, by the hub computer, the payment token to the token computer, wherein the token computer exchanges the payment token for the credential;

receiving, by the hub computer, the credential;

transmitting, by the hub computer, an authorization request message comprising the credential and a total value including the first value and the second value to an authorizing entity computer, wherein the authorizing entity computer approves or declines the authorization request message, and generates an authorization response message; and receiving, by the hub computer, the authorization response message, wherein the hub computer communicates with the first validator system and the second validator system using a first set of APIs and the hub computer communicates with the first ABT computer and the second ABT computer via a second set of APIs.

2. The method of claim 1, wherein the hub computer is a ticketing hub computer.

3. The method of claim 1, wherein the first and second validator systems are different transit systems, each transit system comprises at least one validator server and a plurality of validator devices.

4. The method of claim 1, wherein the first and second validator systems are different transit systems, each transit system comprises at least one validator server and a plurality of validator devices, each validator device comprising an NFC reader.

5. The method of claim 1, further comprising:

performing, by the hub computer, a pre-authorization process or an account verification request process using the payment token before transmitting the authorization request message.

6. The method of claim 1, wherein the user device is a phone or a card.

7. The method of claim 6, wherein the user device comprises an RF ID chip.

8. The method of claim 1, wherein the first and second cryptographic key pairs are symmetric key pairs.

9. The method of claim 1, wherein the authorization request message is an ISO 8583 message.

10. The method of claim 1, wherein the authorizing entity computer is an issuer computer.

11. The method of claim 1, wherein the user device is in a credit card or debit card.

12. The method of claim 1, wherein the credential is a primary account number.

13. The method of claim 1, wherein the first validator system and the second validator system are operated by different validators, the different validators selected from the group consisting of a rail system, a ferry system, a bus system, and an airplane system.

14. A hub computer comprising:

a processor; and a computer readable medium, the computer readable medium comprising code, executable by the processor, for performing operations comprising:

receiving, from a first validator system including a first validator device after a user interacts a user device comprising a credential with the first validator device to conduct a first leg of a journey, an encrypted credential and first interaction data associated with the journey, the encrypted credential being the credential that is encrypted with a first cryptographic key in a first cryptographic key pair;

sending, to a token computer, the encrypted credential, wherein the token computer decrypts, using a second cryptographic key corresponding to the first cryptographic key in the first cryptographic key pair, the encrypted credential to obtain the credential, and exchanges the credential for a payment token, the payment token being a substitute for the credential;

receiving, from the token computer, the payment token;

transmitting the payment token and the first interaction data to a first ABT (account based transaction) computer, wherein the first ABT computer determines that the payment token has been verified, the payment token is not on a first deny list, and a first value associated with the first leg of the journey;

receiving, from the first ABT computer, the first value;

receiving, from a second validator system including a second validator device after the user interacts the user device comprising the credential with the second validator device to conduct a second leg of the journey, an encrypted credential and second interaction data associated with the journey, the encrypted credential being the credential that is encrypted with a third cryptographic key of a second cryptographic key pair;

sending, to the token computer, the encrypted credential, wherein the token computer decrypts, using a fourth cryptographic key in the second cryptographic key pair corresponding to the third cryptographic key, the encrypted credential to obtain the credential, and exchanges the credential for the payment token;

receiving the payment token;

transmitting the payment token and the second interaction data to a second ABT (account based transaction) computer, wherein the second ABT computer determines that the payment token has been verified, the payment token is not on a second deny list, and a second value associated with the second leg of the journey;

receiving, from the second ABT computer, the second value;

providing the payment token to the token computer, wherein the token computer exchanges the payment token for the credential;

receiving, by the hub computer, the credential;

transmitting an authorization request message comprising the credential and a total value including the first value and the second value to an authorizing entity computer, wherein the authorizing entity computer approves or declines the authorization request message, and generates an authorization response message; and receiving the authorization response message, wherein in the operations, the hub computer communicates with the first validator system and the second validator system using a first set of APIs and the hub computer communicates with the first ABT computer and the second ABT computer via a second set of APIs.

15. A system comprising:

a hub computer comprising a processor, and a computer readable medium, the computer readable medium comprising code, executable by the processor, for performing operations comprising, receiving, from a first validator system including a first validator device after a user interacts a user device comprising a credential with the first validator device to conduct a first leg of a journey, an encrypted credential and first interaction data associated with the journey, the encrypted credential being the credential that is encrypted with a first cryptographic key of a first cryptographic key pair, sending, to a token computer, the encrypted credential, wherein the token computer decrypts, using a second cryptographic key in the first cryptographic key pair corresponding to the first cryptographic key, the encrypted credential to obtain the credential, and exchanges the credential for a payment token, the payment token being a substitute for the credential, receiving, from the token computer, the payment token, transmitting the payment token and the first interaction data to a first ABT (account based transaction) computer, wherein the first ABT computer determines that the payment token has been verified, the payment token is not on a first deny list, and a first value associated with the first leg of the journey, receiving, from the first ABT computer, the first value, receiving, from a second validator system including a second validator device after the user interacts the user device comprising the credential with the second validator device to conduct a second leg of the journey, an encrypted credential and second interaction data associated with the journey, the encrypted credential being the credential that is encrypted with a third cryptographic key of a second cryptographic key pair, sending, to the token computer, the encrypted credential, wherein the token computer decrypts, using a fourth cryptographic key in the second cryptographic key pair corresponding to the third cryptographic key, the encrypted credential to obtain the credential, and exchanges the credential for the payment token, receiving the payment token, transmitting the payment token and the second interaction data to a second ABT (account based transaction) computer, wherein the second ABT computer determines that the payment token has been verified, the payment token is not on a second deny list, and a second value associated with the second leg of the journey, receiving, from the second ABT computer, the second value, providing the payment token to the token computer, wherein the token computer exchanges the payment token for the credential;

receiving, by the hub computer, the credential;

transmitting an authorization request message comprising the credential and a total value including the first value and the second value to an authorizing entity computer, wherein the authorizing entity computer approves or declines the authorization request message, and generates an authorization response message, and receiving the authorization response message, wherein in the operations, the hub computer communicates with the first validator system and the second validator system using a first set of APIs and the hub computer communicates with the first ABT computer and the second ABT computer via a second set of APIs; and the first validator system in communication with the hub computer.

16. The system of claim 15, further comprising:

the second validator system in communication with the hub computer.

17. The system of claim 15, wherein the first validator device is a fare gate.

18. The system of claim 15 wherein the first validator system is operated by a rail system, and the second validator system is operated by a bus system.

* * * * *